Dec. 21, 1926.  1,611,279
M. H. RAMSBURG
APPARATUS FOR MOUNTING NONSKID CHAINS ON AUTOMOBILE WHEELS
Filed May 2, 1925    6 Sheets-Sheet 3

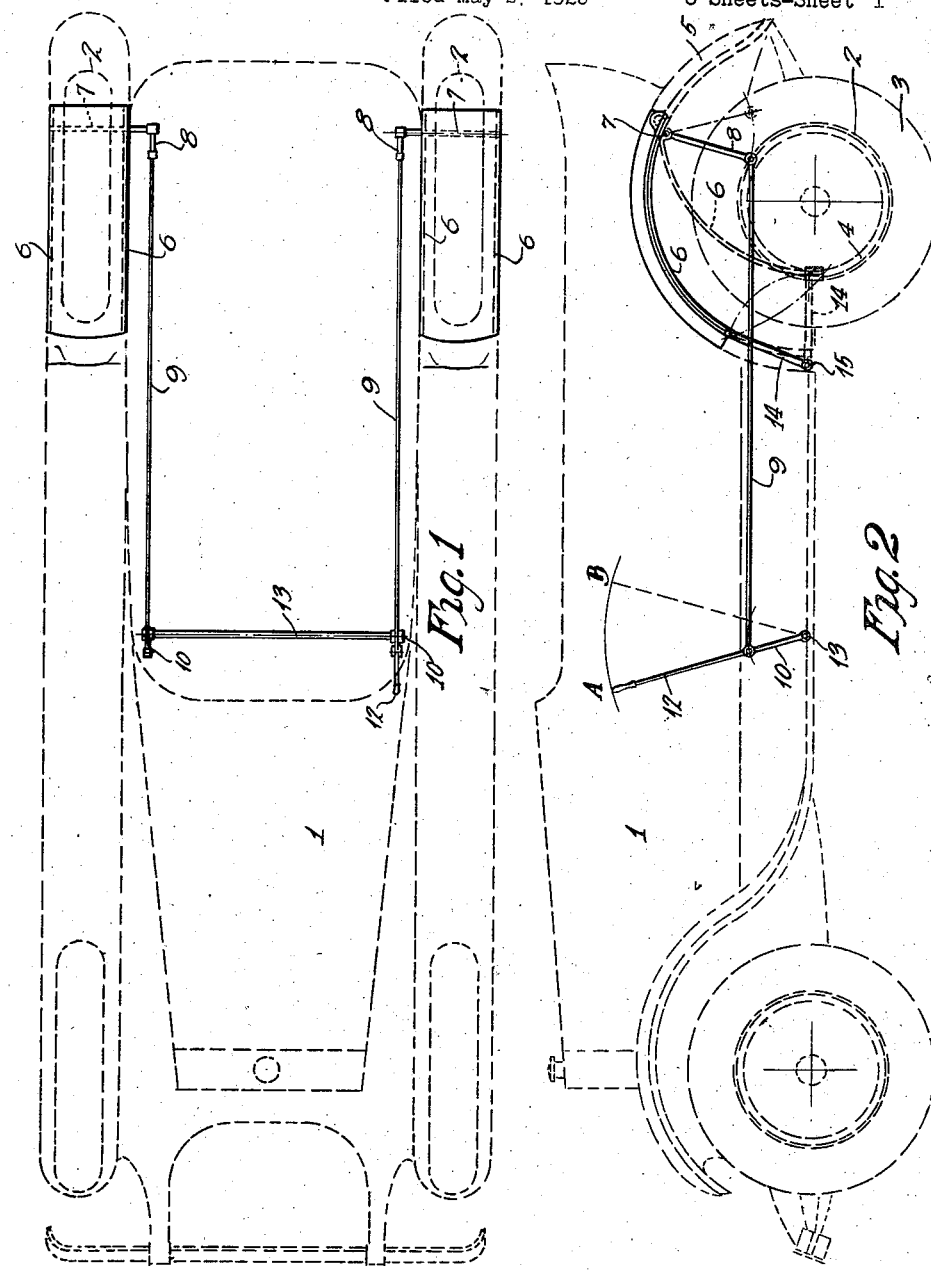

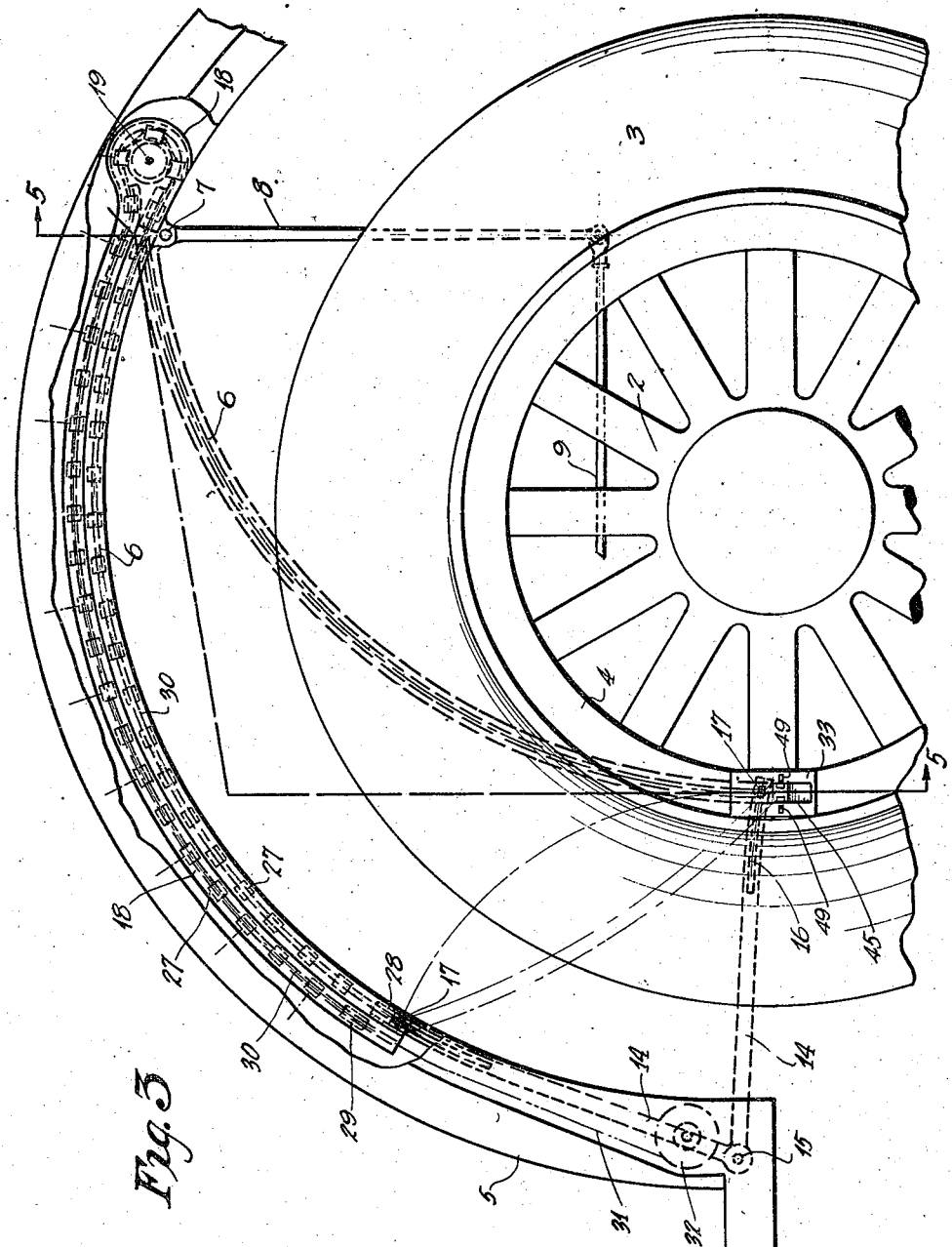

INVENTOR.
Mehrle H. Ramsburg
BY James L. Stewart
ATTORNEY.

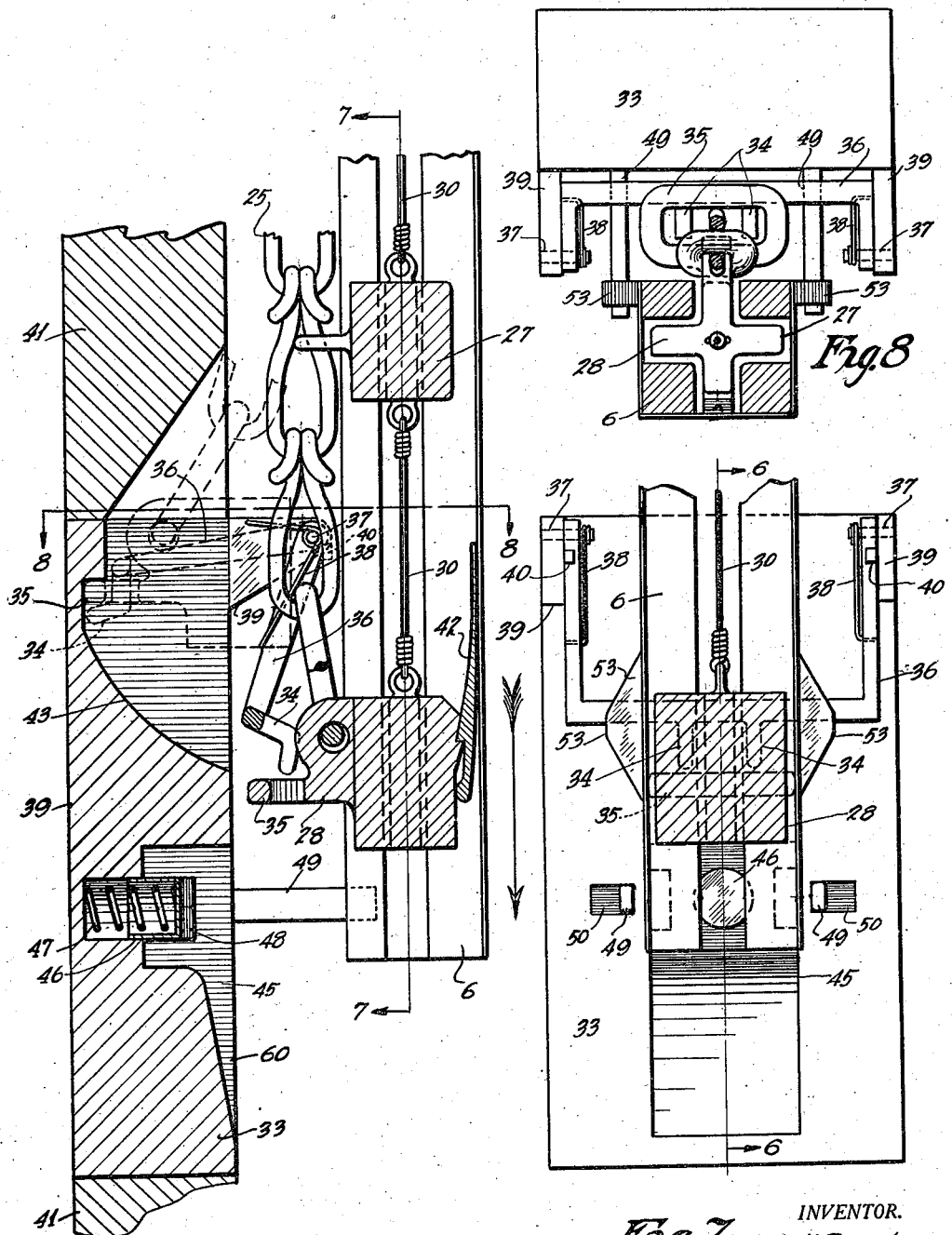

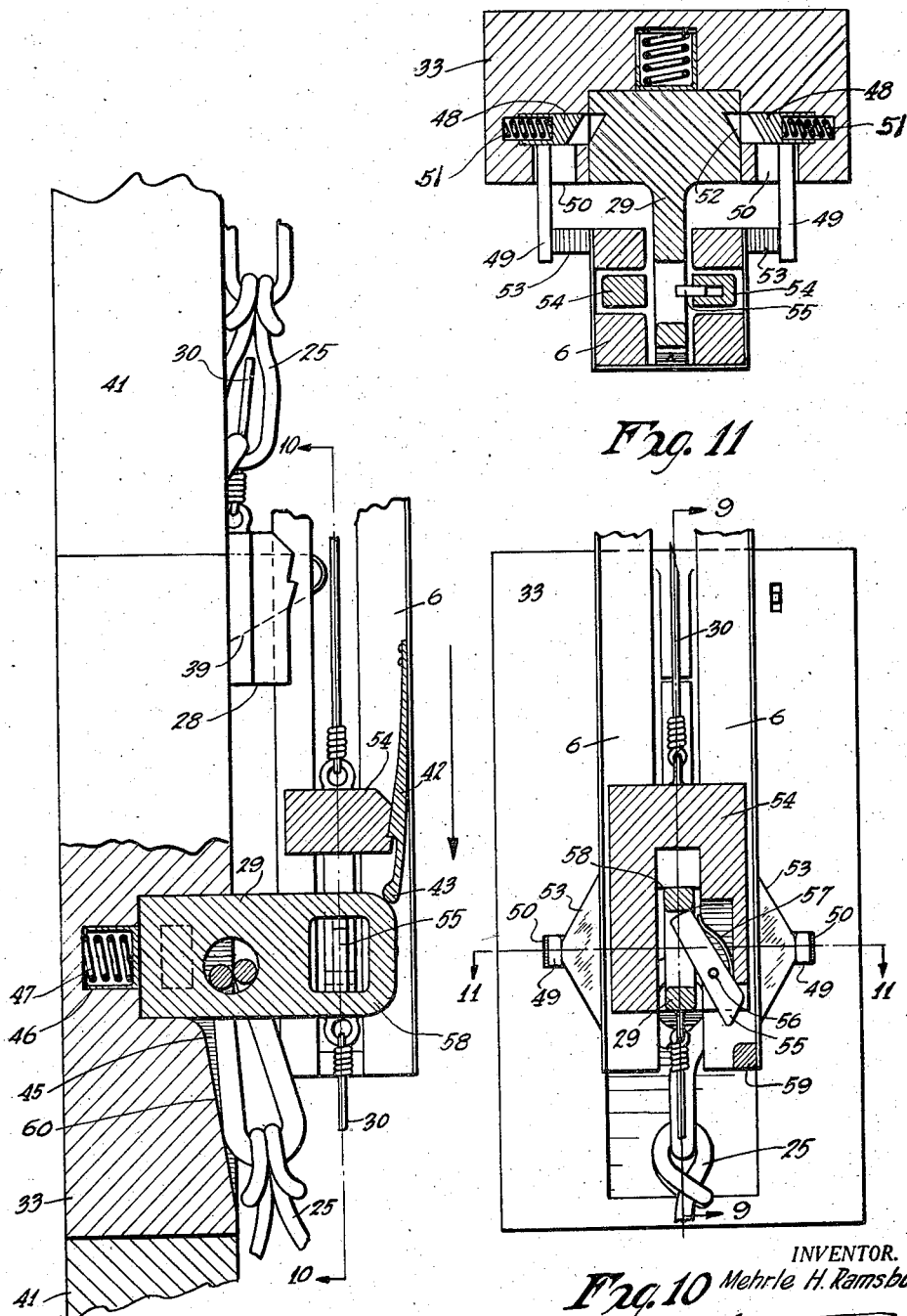

Dec. 21, 1926.
M. H. RAMSBURG
1,611,279
APPARATUS FOR MOUNTING NONSKID CHAINS ON AUTOMOBILE WHEELS
Filed May 2, 1925  6 Sheets-Sheet 6
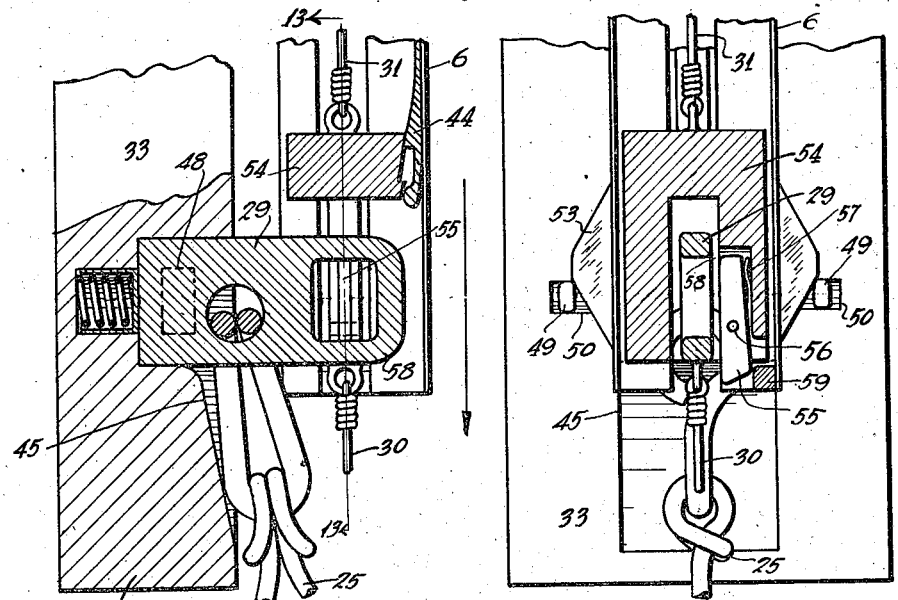
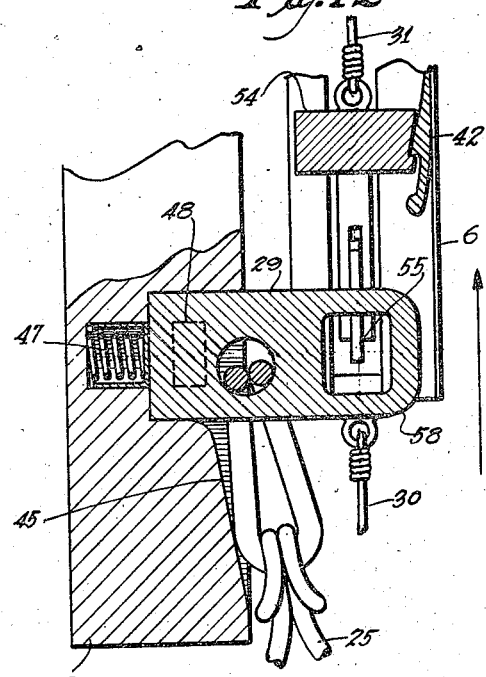
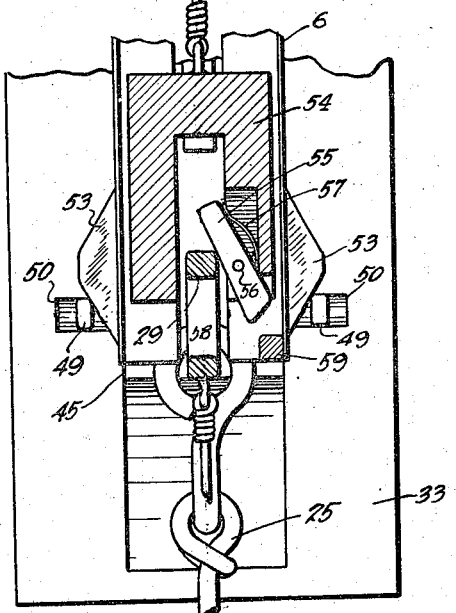
INVENTOR.
Mehrle H Ramsburg
BY James L. Stewart
ATTORNEY.

Patented Dec. 21, 1926.

1,611,279

UNITED STATES PATENT OFFICE.

MEHRLE H. RAMSBURG, OF LEWISTOWN, MARYLAND.

APPARATUS FOR MOUNTING NONSKID CHAINS ON AUTOMOBILE WHEELS.

Application filed May 2, 1925. Serial No. 27,366.

This invention relates, generally speaking, to the positioning of non-skid chains on the wheels of motor vehicles.

Heretofore it has been the practice to apply skid chains to the wheels manually. That is to say, the wheels are either jacked up and the chains manually put on, or the chains are laid out flat and the wheels run on to the chains and thereafter manually wrapped around the wheels and secured in place.

The object of the present invention is to provide simple and efficient means, whereby the chains may be mechanically applied to the wheels without requiring the driver to leave the seat of the vehicle.

Speaking generally, the invention consists in the provision of means for supporting a chain in proximity to a wheel to which it is to be applied and to one free end of which chain is secured means operable by the driver of a vehicle to shift said free end of the chain into a position to be engaged with attaching means carried by the felly of the wheel, so that through subsequent rotation of the wheel, the chain is withdrawn from the means which normally retains and supports it, and is wrapped about the wheel until the wheel is completely surrounded by the chain whereupon the opposite free end of the chain is automatically engaged with retaining means on the felly to lock the chain in operative position about the wheel. The manually operable attaching means may then be withdrawn and the chains will function as is usually the case with non-skid chains.

In one of its preferred practical forms, the chain is supported, when not in use, within a suitable retainer carried on the under side of the mud guard and said retainer embodies pivoted sections which are operable through link and lever connections by the driver to shift said pivotal sections into such position that the chain may be fed from the retainer directly to the wheel. One end of the chain is provided at its free end, which is normally at the free ends of the pivoted sections, with attaching members which, when brought into juxtaposition with the revolving wheel will become automatically attached thereto.

The pivoted sections are held in the chain feeding position until the complete chain is fed to the wheel and the wheel entirely surrounded thereby, whereupon the rear end of the chain is automatically engaged with attaching means on the wheel and said rear end of the chain simultaneously disconnected from the pivoted sections. The sections are thereupon retracted to leave the car in normally operative position.

In order that the chain may be kept taut, while it is being fed to the wheel, and that it may be subsequently returned into the receptacle which normally houses it, the rear end of the chain is preferably secured to a tension member which cooperates with the spring actuated drum mounted on the mud guard and through the use of this cable, the position of the chain within or its removal from this retainer is facilitated.

Features of the invention, other than those adverted to, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1 is a plan view of the complete apparatus embodying the present invention and illustrating the same as associated with an automobile which is shown in dotted lines.

Figure 2 is a side elevation of Figure 1.

Figure 3 is an enlarged fragmental side elevation of one rear wheel of the car and the mud guard with which is associated mechanism embodying this invention.

Figure 6 is a section on the line 6—6 of Figure 7.

Figure 7 is a section on the line 7—7 of Figure 6.

Figure 8 is a section on the line 8—8 of Figure 6.

Figure 9 is a section on the line 6—6 of

Figure 4:
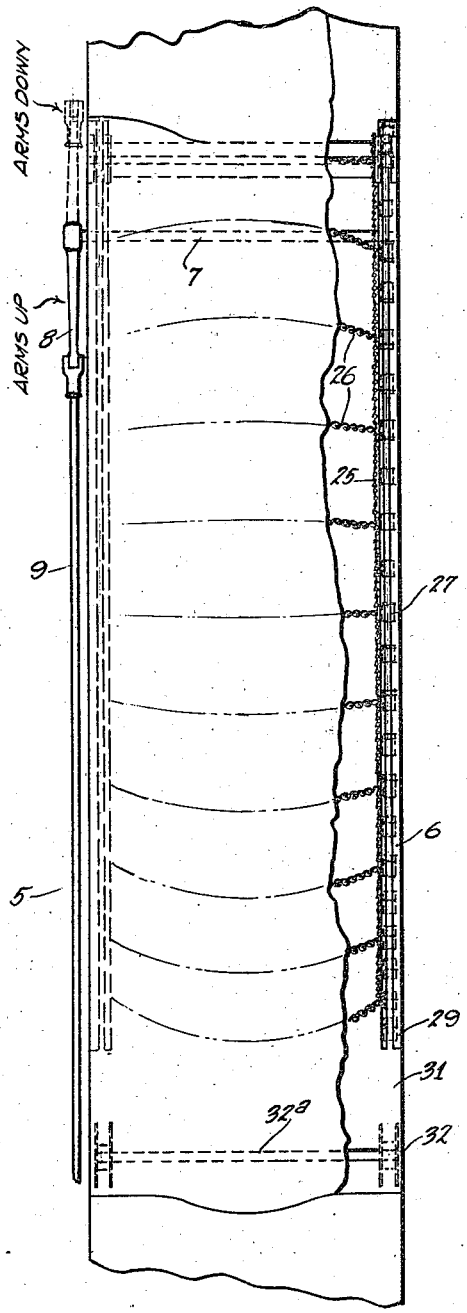
Figure 4 is a plan view of the parts shown in Figure 3 with a part of the mud guard broken away in the interest of clearness.

Figure 7, but showing the position of the parts at the instant the wrapping of the chain about the wheel is concluded and before the chain is released from its feeding means.

Figure 10 is a section on the line 10—10 of Figure 9.

Figure 11 is a section on the line 11—11 of Figure 10.

Figure 12 is a section similar to that shown in Figure 9, but illustrating the manner in which the rear end of the chain is released from the means which feeds it to the wheel.

Figure 13 is a section on the line 13—13 of Figure 12.

Figures 14 and 15 are views similar to Figures 12 and 13, but show the chain fully released from its feeding means and its rear end locked to the wheel.

Referring to the drawings, 1 designates an automobile having rear wheels 2. Each wheel is provided with the conventional tire 3 mounted on felly 4, and 5 designates the rear mud guards. Inasmuch as the mechanism of this invention is, in the main, duplicated for each wheel, I will simply describe the mechanism associated with one wheel and it will be understood that it will apply to all other wheels of the vehicle with which it is desired to use the invention.

It will be noted that the rear mud guard 5, at, e. g., the left hand rear of the car, is provided on its under side with two pivoted guide sections 6. These sections are mounted at their rear ends on transverse shafts 7, which are journalled for rotation in the mud guard and the sections 6 extend in lateral parallel relation along the opposite edges of the mud guard and in a forward direction, being longitudinally curved to conform with the longitudinal curve of the mud guard.

Suitable bearings in the mud guard are provided for the shafts 7 and rigid with each shaft 7 is an operating arm 8, to the free end of which is connected a link 9. The shafts 7 of both rear mud guards of the car are connected by links 9 to arms 10 which are rigid with a rock shaft 13. This rock shaft 13 extends transversely of the car and is mounted in suitable bearings to permit of its oscillation. One of the arms 10 is extended in an upward direction to form operating handle 12 and through the connections described movement of the operating handle is communicated to both shafts 7 for the purpose of moving the pivoted sections 6 from the full line position of Figures 2 and 3 into dotted line position and vice versa, as the operator may desire. In order that the free ends of the pivoted guide sections 6 may be properly guided, I associate with the free end of each guide section, a link 14. One end of each of these links is pivoted at 15 to the mud guard, while the other end of such link is slotted as shown at 16 for co-operation with a stud 17 carried by the end of the associated guide section.

From the rear ends of each of the guides 6 extend fixed guides 18 which, in effect, form a continuation of the guides 6. The guides 18 are rigid with the mud guard and extend rearwardly and follow the curve of the mud guard until they reach a roller 19. Here the lower half of each guide stops, while the upper half curves around the roller 19, this roller being curved to take the place of the bottom half of each guide 18, as will be hereinafter more fully explained.

Beyond the roller 19, the guides 18 are extended forwardly, are rigidly secured to the under side of the mud guard and partake of the curvature thereof. The guides 18 along either edge of the mud guard are connected by curved metal partitions 20, 21 and 22, as shown best in Figure 5, and form between them arcuate chambers 23 and 24.

Figure 5:
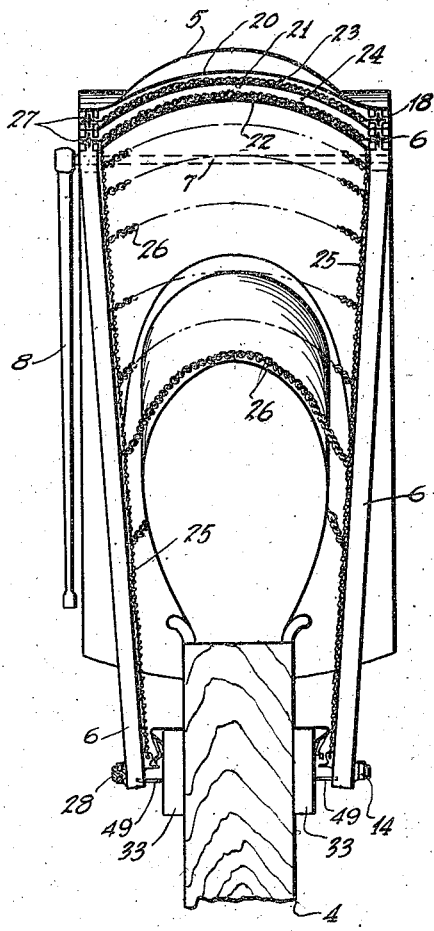
Figure 5 is a section on the line 5—5 of Figure 3.

Each of the guides 6 and 18 at either margin of the mud guard are of the peculiar shape shown in Figure 5 and in larger section in Figure 8. Each guide is of rigid construction and is channelled to form a guideway for substantially cruciform slide blocks 27.

The antiskid chain 25 with cross links 26 is adapted to be normally housed within the chambers 23 and 24, and the blocks 27, of which there are a considerable number, are connected to the side chains 25 at each cross chain 26, with as many in between as are necessary to properly guide and support the chain. An additional block 28 is connected to the front end of each side chain, and a further block 29 to the rear end of such chains. All of these blocks 27, 28 and 29 are, in turn, connected by wire links 30.

The rear blocks 29 are connected to cables 31 which extend about spring actuated drums 32 carried on a transverse shaft 32ª carried by the mud guard and these spring actuated drums tend to constantly wind up the cables 31 and maintain the side chains 25 constantly under tension.

On each side of the felly is mounted a block 33 designed to engage the ring 35 of one of the terminal blocks 28 when the wheel is turned while said terminal block is in position for such engagement. Pivotally mounted on the block 33 are twin hooks 34 carried by a bracket 36 which is, in turn, carried by pivots 37. These pivots 37 extend through arms 39 forming part of the block 33. Springs 38 normally impel the bracket 36 into such position that the twin hooks 34 are capable of engagement with the ring 35 of the terminal block 28. It will be noted from Figure 6, however, that the twin hooks 34 and the arm on which they are carried can be shifted on the pivots 37 into the dotted line position of this figure and in which position they enter a recess 43 in the block 33 as will be hereinafter more fully explained. Stops 40 on the arms 39 limit the outer movement of the bracket 36.

The felly block 33 is also provided with a recess 45 which is off side slightly in a direction radially of the wheel from alinement with the hook projections 34 and in the base of this recess 45 is a piston 46 back of which is a spring 47. This recess is designed to receive the rear block 29, as shown in Figure 9, and in the side of such recess are catches 48 (see Figure 11) back of each of which is a spring 51. Attached to each latch is a rod 49 which projects through the outer face of the block 33 and works in a slot 50.

Mounted on the forward end of each of the pivoted guide sections 6 are cams 53 (see Figures 13 and 15), which, at the proper time, as hereinafter explained, engage with the rods 49 and actuate them to retract the catches 48.

The follower block 54 is hollow and in one arm of this cruciform cross section is mounted a catch 55 pivoted at 56 and acted upon by a spring 57. This catch normally engages with a ring 58 on the block 29 and serves to normally lock the block 29 to the block 54. However, when the block 54, after traveling the length of its corresponding guide section 6 arrives at the free end thereof, the heel of the latch 55 is adapted to engage with a stop 59 mounted at the extreme outer end of the guide section 6 and through this engagement, the latch 55 may be retracted from engagement with the ring 58 to release said ring.

In practice, the block 33 may be set into the felly so that the outer surface of said block is flush with the outer surface of the felly and this arrangement is of course duplicated on both sides of each wheel. This flush arrangement is satisfactory when the felly of the wheel is unobstructed by tire holding bolts or locking lugs, but in such constructions as employ locking lugs or similar means to hold a demountable tire in position, the blocks 33 preferably extend beyond the outer face of the felly and at either side thereof for a distance greater than the dimension of the locking lugs and an annular ring is positioned to cover the locking lugs and to bridge the annular space between one end of each block 33 and the other end of the corresponding block. Such a ring is shown in section in Figures 6 and 9 and is designated 41.

Having now described the structural elements of the invention, I will now proceed to set forth the manner in which the apparatus operates.

Under normal conditions, the antiskid chain is contained in compact condition within the guides 6 and 18, the former being folded up under the mud guards, as shown in the full line position of Figure 3. When it is desired to apply the chains, the hand lever 12 is drawn from the full line position of Figure 2 into the dotted line position of such figure and through such operation, the pivoted guide sections 6 are moved into the dotted line positions of Figures 2 and 3. Either during this operation or thereafter, slow movement is imparted to the car in a forward direction in order that the rear wheels may be caused to rotate. The movement of the pivoted guide sections has shifted the free ends of the several guide sections 6 into a position wherein the forward slide blocks 28 of each of the chains lie in the path of twin hooks 34 at either side of each wheel. These hooks, by virtue of the springs 38, are in the outermost full line position of Figure 6, and as the wheels rotate, the hooks 34 enter and engage with the rings 35 of the blocks 28.

As the wheels continue to rotate, the chain is pulled from the guides and is slowly fed out thereby until the wheel has made one complete rotation. During this operation, the chains are kept taut by the spring drums 32 and a smooth and regular feed of the chain results. The pull on the chain serves to draw the brackets 36 into the retracted dotted line position of Figure 6.

After the wheels have made one complete rotation, the movement of such wheels automatically positions the recesses 45 in alinement with the terminal blocks 29 which, by this time, have been withdrawn to substantially the ends of the pivoted guide sections 6. Inasmuch as these terminal blocks are held by the guide sections against the felly or guide ring 41 under more or less pressure, these terminal blocks will immediately spring into the recesses 45. It will be noted, however, that by the time the terminal blocks are alined with the recesses, the cams 53, (Fig. 11) will have engaged with the rods 49 and retracted the catches 48, so as to permit the terminal blocks 29 to enter into the bases of the recesses 45.

As the wheels continue to turn, the terminal blocks 29 will be carried along therewith and will move the latch 55 against the stop 59, as shown in Figure 13, to retract the latch and release the ring 58 of the terminal block 29. As soon as this release takes place, the spring drums 32 will immediately retract the block 54 which will be engaged by a detent 42 mounted on the interior of each guide section 6, as shown in Figure 9. The chains are now firmly secured to the wheels and are capable of functioning in the usual manner. The lever 12 is next retracted to the normal full line position of Figure 1 and the car may thereupon pick up speed and proceed as usual.

When it is desired to remove the chains, this operation is accomplished as follows.

The car is backed very slowly to introduce the rings 58 of the terminal blocks 29 into the free ends of the guide sections 6 which have been previously shifted into position to receive these terminal blocks. As the terminal blocks enter the free ends of the guides, they pass by the latches 55 until these latches engage with the rings 58. Further movement of the terminal blocks 29 bring them into engagement with the nose 43 of each detent 42 and cause these detents to be flexed outwardly to release the blocks 54. As soon as this has occurred, the tension of the springs in the drums 32 will be exerted on the terminal blocks 29 and will tend to draw the chains back into the guides. By the time, however, the terminal blocks have been engaged with the latches 55 and release the detents 44, the wheels will have moved into position to engage the rods 49 with the cams 53, thereby to retract the catches 48 and release the terminal blocks 29 out of the recess 45 as soon as the catches are released and thus render the terminal blocks capable of responding to the pull of the spring drums.

As the car continues to slowly back up and the chains are slowly unwound from the wheels, the spring drums of the guides draw the chain longitudinally of these guides into the chambers 23 and 24, until the forward terminal blocks 28 are reached. These terminal blocks will enter the free ends of the guide sections 6 and will be engaged and arrested by the detents 42, as shown in Figure 6. Further movement of the wheels in a rearward direction will swing the hooks 34 into the full line position of Figure 6, thereby automatically releasing the terminal blocks 28 from these hooks and leaving the parts in the position which they initially occupy so that the operations described incident to the attaching of the chains may be again carried on when the circumstances require.

If desired, the free ends of the pivoted guide sections 6 may be flared out slightly or enlarged to form a bill shaped mouth which would more readily pick up or receive the cruciform guide blocks during the removal of the chains from the wheels. I have not, however, considered it necessary to illustrate this arrangement in the drawings as it will be obvious to those skilled in the art.

It will be apparent from the foregoing detailed description of the invention that it provides means whereby chains normally housed in concealed position can be applied to and removed from the wheels of a vehicle by movement of the vehicle and without manual intervention except that necessary to insure the operation of automatic mechanism.

The drawings show the invention in its preferred form, but inasmuch as I am aware of additional ways in which the same work may be carried out, I wish it understood that the invention is not limited to the specific showing of the drawings, but that in contradistinction, it is to be construed as fully commensurate with the appended claims.

Having thus fully described the invention, what I claim as new and desire to secure by Letters Patent is:

1. In an apparatus for applying skid chains to an automobile, the combination with an automobile, of a container mounted thereon and embodying guides in which a non-skid chain is slidably carried and portions of which guides are mounted for pivotal movement, retaining means carried by a wheel of the automobile for engaging the opposite ends of the chain in succession, and manually operable means for shifting the pivoted sections of the guides into a position to feed the chain to the chain retaining means of the wheel.

2. In an apparatus for applying skid chains to an automobile, the combination with an automobile, of retaining means carried by the wheel for engaging the front and rear ends of an anti-skid chain, an anti-skid chain provided at its opposite ends with attaching devices, cooperable with the corresponding chain retaining means on the wheel, chain guides mounted on the automobile for normally supporting the chain in concealed position and a portion of which guides are mounted for pivotable movement, and means, operable by an occupant of the car and while the car is in motion, to shift the pivotal sections of the guides to position the attaching means at the front end of the chain in the path of the corresponding chain retaining means on the wheel, whereby, as the wheel rotates, the front end of the chain is attached thereto and the chain is wrapped about the wheel to automatically bring the attaching means at the rear end of the chain into cooperation with the corresponding retaining means on the wheel.

3. In an apparatus for applying skid chains to an automobile, the combination with an automobile, of retaining means carried by the wheel for engaging the front and rear ends of an anti-skid chain, an anti-skid chain provided at its opposite ends with attaching devices, cooperable with the corresponding chain engaging means on the wheel, chain guides mounted on the automobile for normally supporting the chain in concealed position and a portion of which guides are mounted for pivotal movement, means, operable by an occupant of the car and while the car is in motion, to shift the pivotal sections of the guides to position the attaching means at the front end of the chain in the path of the corresponding chain retaining means on the wheel, whereby, as the wheel rotates, the front end of the chain is attached thereto and the chain is wrapped about the wheel to automatically bring the attaching means at the rear end of the chain into cooperation with the corresponding retaining means on the wheel, a spring actuated drum carried by the automobile in cooperative relation to the chain guides, a tension member coiled about the drum and detachably connected to the rear end of the chain for precluding kinking of the chain, and means for automatically releasing the chain from said cable after the attachment of the chain to the wheel is completed.

4. In an apparatus for applying skid chains to an automobile, the combination with an automobile having a chain container thereon, of retaining means carried by the wheel for engaging the front and rear ends of an antiskid chain, an antiskid chain normally housed in the container and provided at its opposite ends with attaching devices, cooperable with the corresponding chain retaining means on the wheel, chain guides mounted on the automobile for normally supporting the chain in concealed position and a portion of which guides are mounted for pivotal movement, means, operable by an occupant of the car and while the car is in motion, to shift the pivotal sections of the guides to position the attaching means at the front end of the chain in the path of the corresponding chain retaining means on the wheel, whereby as the wheel rotates, the front end of the chain is attached thereto and the chain is wrapped about the wheel to automatically bring the attaching means at the rear end of the chain into cooperation with the corresponding retaining means on the wheel, a spring actuated drum carried by the automobile in cooperative relation to the chain guides, a tension member coiled about the drum and detachably connected to the rear end of the chain for precluding kinking of the chain, and means for automatically releasing the chain from said cable after the attachment of the chain to the wheel is completed, said drum being adapted to act through the tension member to return the chain into the container when the chain is released from the wheel.

Signed by me at Frederick, Md. this 18th day of April 1925.

MEHRLE H. RAMSBURG.